United States Patent [19]
Cornett, III et al.

[11] 3,936,264
[45] Feb. 3, 1976

[54] APPARATUS FOR BLOW MOLDING A CONTAINER WITH BREACHABLE SEALING MEMBERS

[75] Inventors: Walter G. Cornett, III, Wilmette; Donald G. Gaspar, Burbank, both of Ill.

[73] Assignee: Respiratory Care, Inc., Arlington Heights, Ill.

[22] Filed: Mar. 6, 1974

[21] Appl. No.: 448,684

Related U.S. Application Data

[62] Division of Ser. No. 338,878, March 7, 1973, Pat. No. 3,851,029.

[52] U.S. Cl. ......... 425/326 B; 425/387 B; 425/388; 425/DIG. 214
[51] Int. Cl.² ........................................... B29D 23/03
[58] Field of Search .......... 264/89, 92, 96; 425/387, 425/387 B, 388, 326 B, DIG. 214

[56] References Cited
UNITED STATES PATENTS

| | | |
|---|---|---|
| 3,275,726 | 9/1966 | Rudolph ............................ 425/326 |
| 3,278,666 | 10/1966 | Donald ...................... 425/DIG. 214 |
| 3,398,427 | 8/1968 | John .......................... 425/DIG. 214 |
| 3,464,085 | 9/1969 | Burkett et al. ......................... 264/98 |
| 3,597,793 | 8/1971 | Weiler ................................ 425/326 |
| 3,640,672 | 2/1972 | Starr ..................................... 425/326 |
| 3,669,602 | 6/1972 | Hansen ................................. 425/388 |
| 3,717,430 | 2/1973 | Hansen ................................. 425/395 |

*Primary Examiner*—Francis S. Husar
*Assistant Examiner*—Carl Rowold
*Attorney, Agent, or Firm*—Eric P. Schellin

[57] ABSTRACT

There is disclosed herein a method for blow molding a bottle, for instance, from a tube of thermoplastic material. The method includes filling such a container, if desired, with a fluid prior to sealing of the bottle. The bottle has at least one orifice which may be sealed with an integral membrane and a further protective cap is integrally molded with the bottle. More particularly, apparatus is also disclosed for molding, filling and sealing such bottles in one operation from a tube of thermoplastic material which has relatively movable mold parts.

13 Claims, 15 Drawing Figures

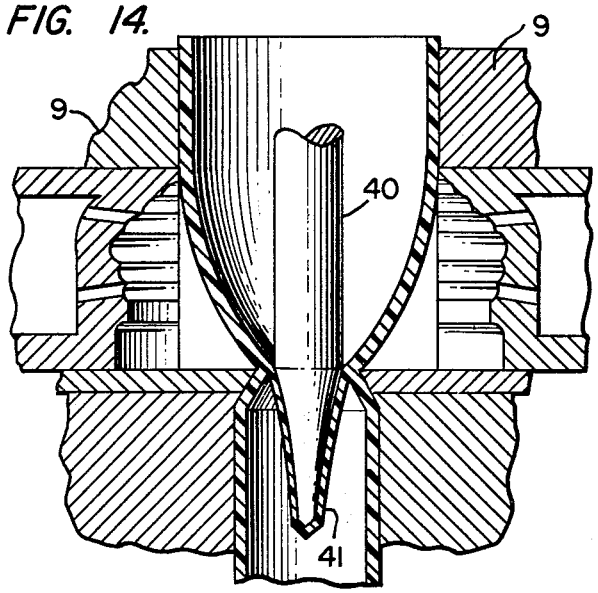
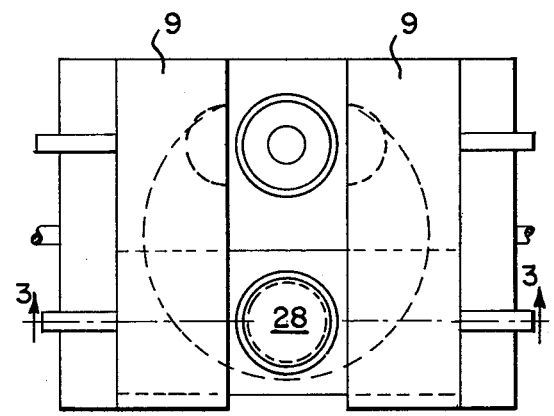
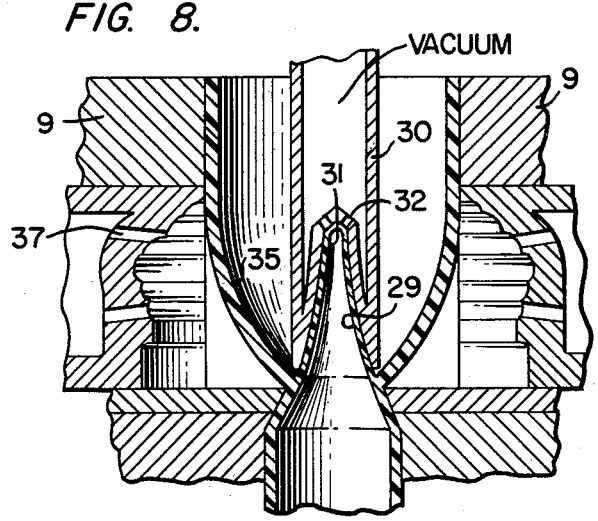
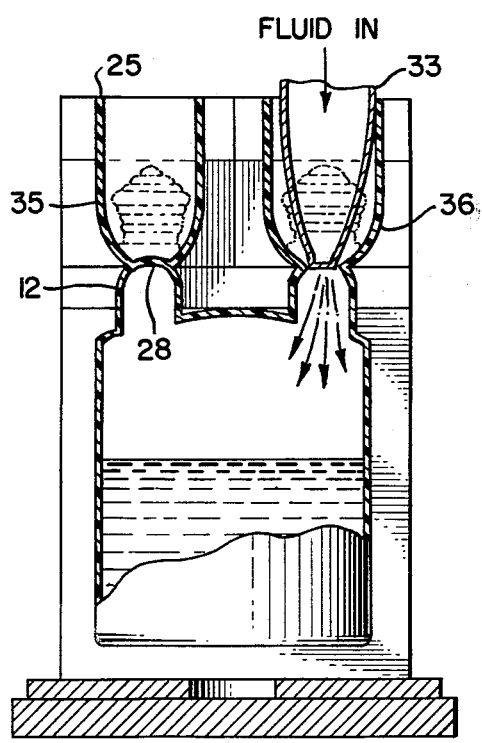
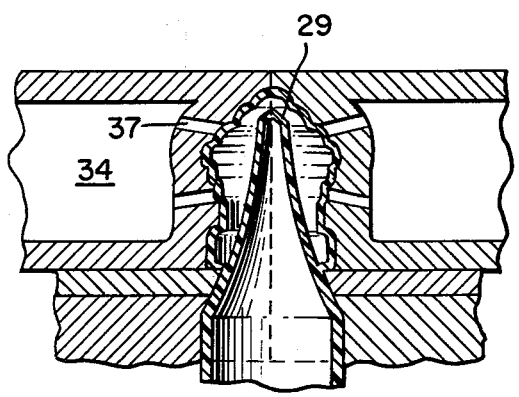

APPARATUS FOR BLOW MOLDING A CONTAINER WITH BREACHABLE SEALING MEMBERS

This is a division of application Ser. No. 338,878 filed Mar. 7, 1973, which issued as U.S. Pat. No. 3,851,029 on Nov. 26, 1974.

BACKGROUND OF THE INVENTION

There has been considerable activity in the blow molding of bottles constructed of thermoplastic materials such as polyethylene and polypropylene. These bottles are conventionally blow molded and then filled. Finally they are capped. Most of the prior art has dealt with such bottles wherein they are sealingly capped at a much later date after filling.

Of fairly recent vintage is the concept of blow molding a bottle in a conventional manner and then filling the bottle with a fluid material while the bottle is retained in the mold. The bottle is integrally sealed with thermoplastic material after filling. The seal is usually a breachable membrane or a cap which may be broken away along a weakened part line. The attractiveness in this manner of fabrication resides in the fact that the contents in the bottle are admitted when sterile and are then sealed therein in a sterile condition. The bottle has not been exposed to ambient conditions prior to filling so that organisms have not had the opportunity to invade the interior of the bottle.

The mode of operation and the apparatus therefor of a prior art technique can be seen in U.S. Pat. No. 3,325,860. This patent discloses the general concept of blow molding and filling a thermoplastic bottle prior to integrally sealing. The present invention is an ingenious improvement over such prior art disclosure.

SUMMARY OF THE INVENTION

This invention relates, generally, to a method and apparatus for molding, filling and sealing a container made of thermoplastic material in a single continuous operation. The apparatus has an extrusion head which extrudes thermoplastic tubing a section of which, whilst still hot and relatively soft, is enclosed in a sectional mold. A fluid under pressure is supplied internally with respect to the extruded tubing in the mold to thereby distend the tube into contact with the mold surface to form a container. It will be appreciated that the fluid under pressure may be the material with which the container is to be filled or it may be, for example, a gas which is subsequently displaced from within the container when the material with which the container is to be filled is supplied to the blown container. The container has at least initially formed therewith two necks, each having an integrally breakaway cap. At least one of the necks terminates in a breachable seal which may have an outwardly extending or inwardly extending cone-like configuration. The breachable seal is then encompassed with a cap. The seal and caps are integrally molded by the apparatus herein disclosed and by the method herein also taught.

BRIEF DESCRIPTION OF THE DRAWINGS

One example of an apparatus constructed in accordance with the invention is illustrated in the accompanying drawings in which:

FIG. 5 is a view taken along line 5—5 of FIG. 3.

FIG. 6 is a cross-sectional view taken along line 6—6 of FIG. 3.

FIG. 8 is a similar view as in FIG. 7.

FIG. 9 is a similar view as in FIGS. 7 and 8.

FIG. 14 is another embodiment of the arrangement of FIGS. 8 and 10.

DETAILED CONSIDERATION OF THE INVENTION

Figure 1:
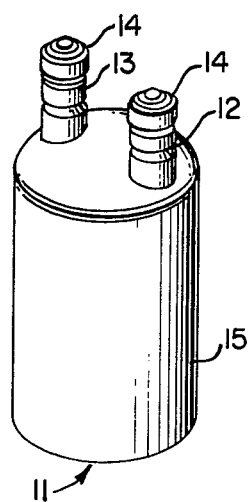
FIG. 1 is a perspective view of a bottle produced by practicing the instant invention.
Figure 12:
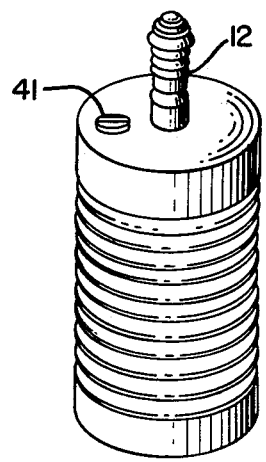
FIG. 12 is a perspective view of another embodiment of a bottle constructed in accordance with the present invention.

Attention is now directed to FIG. 1, in which a thermoplastic container 11 is shown having two necks 12 and 13, respectively, displaced from the axis of the container. The necks terminate in caps 14 on each. In the embodiment shown in FIG. 1 the body 15 of the container has a cylindrical configuration. It is pointed out that the body of the container may have any one of a wide number of configurations, unusual shapes and designs. The design of the body of the container is only limited by the molds used and by the thermoplastic material employed. With regard to the thermoplastic materials, a wide range of such materials are contemplated as coming within the purview of the invention, for instance, polyethylene and polypropylene. It will also be noted that the container illustrated in FIG. 12 is a perspective view of another embodiment of the present invention wherein only one neck is provided in the resultant.

Figure 2:
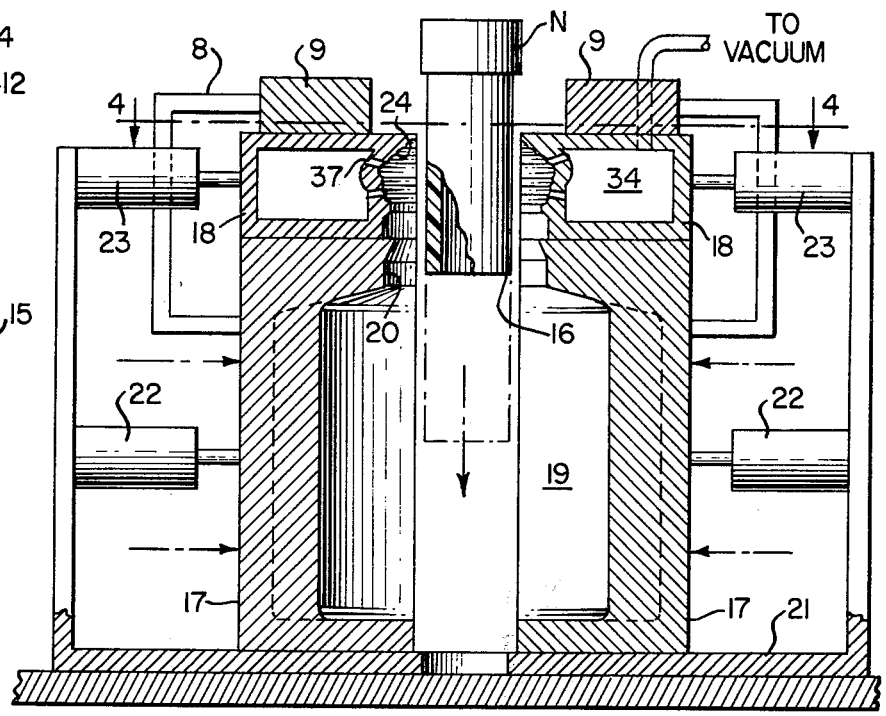
FIG. 2 is a cross-sectional view of the apparatus of the present invention taken along line 2—2 of FIG. 4 with the mold in an open position.

The container of the present invention is blow molded in sectional molds from an extruded hot thermoplastic tube. Attention is now directed to FIG. 2 wherein a conventional nozzle N extrudes a tube 16 of thermoplastic material such as polyethylene material. The tube 16 proceeds between a group of sectional molds. The main sectional molds 17 are located below the upper sectional molds 18. The main molds each have a large cavity 19 designed to constrain the thermoplastic material to form the body of the container. The main molds 17 also have a pair of smaller cavities 20 to form the necks 12 and 13. The main molds are slidably positioned on flat surface 21. They are propelled to and fro by suitably positioned cylinder and piston means 22 operated with a fluid.

Figure 4:
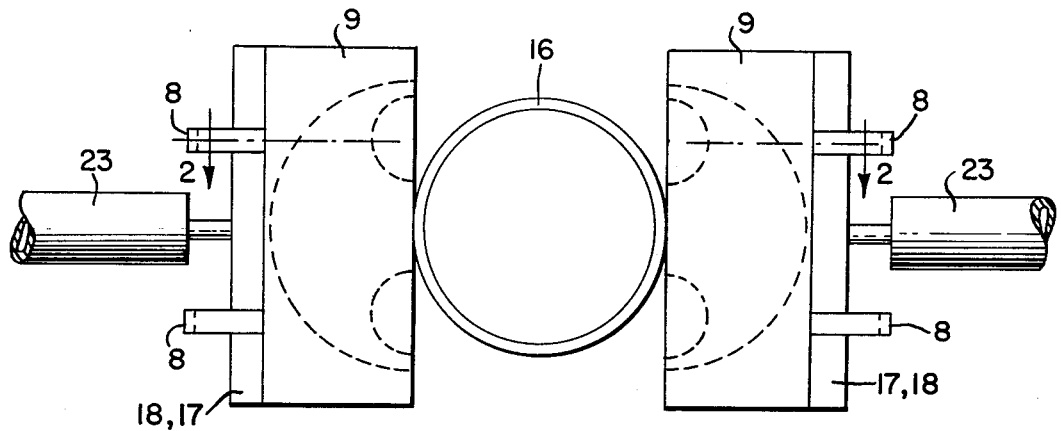
FIG. 4 is a view taken along line 4—4 of FIG. 2.

As in a normal blow molding operation, the main mold is rapidly closed on the thermoplastic tube which is continuously extruded. When the molds are closed the extruded parison is cut off and the molds are transferred to the blow molding and filling station. The view shown by FIG. 4 shows the thermoplastic tube 16 between the pair of upper sectional molds 18 with the main mold sections still in the open mode. The upper sectional molds are also driven by an appropriate hydraulic means 23. The upper sectional molds each have a cavity 24 designed to vacuum form a cap for the container. In the FIG. 2 as depicted the cap would be identified by reference numeral 14 in FIG. 1.

Figure 3:
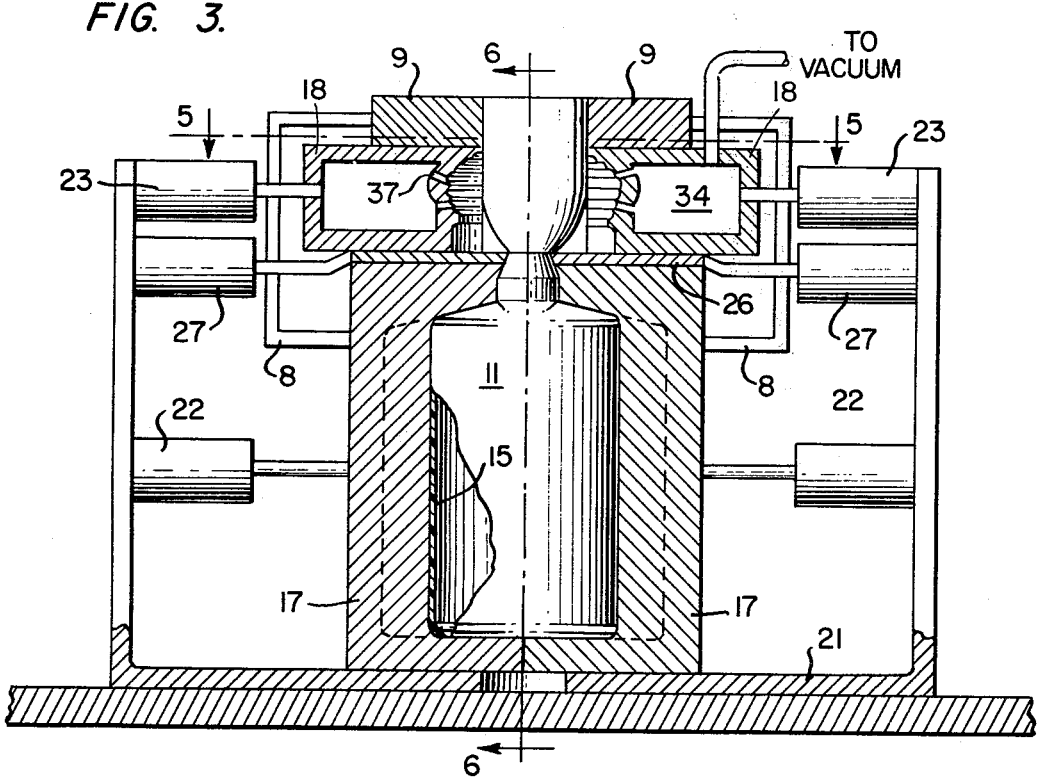
FIG. 3 is a cross-sectional view of the apparatus taken along line 3—3 of FIG. 5 and along the same plane as in FIG. 2 wherein the main mold is in a closed position and a pinch means has operated.

In FIG. 5, the main molds 17 have closed on the tube 16, thereby both pinching off and closing the bottom, as shown in FIG. 3. The closing of the main mmolds also pinches off the top of the tube, thereby leaving two upwardly standing neck portions. The uppermost portion of the necks has been cut at 25 as illustrated by FIG. 6, for instance. The two upwardly standing neck portions are held in position by vacuum holding jaws 9 positioned above molds 18. The holding jaws are connected to the molds 17 by means of brackets 8, for instance, and are therefore designed to move with molds 17.

Figure 7:
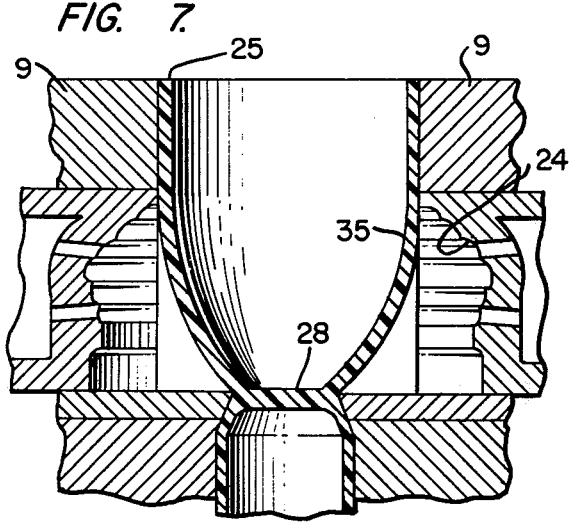
FIG. 7 is a fragmentary close-up view in cross section as in FIG. 3.

When the main mold sections have been closed as in FIG. 3 and the respective necks have been formed as shown in FIG. 6; a slidable pinching means 26, shown in FIGS. 3 and 5 move between the main mold and the upper mold under the aegis of fluid operated piston and cylinder means 27 to bring together a plug 28 of thermoplastic material at the top portion of neck 12, which slug is disposed generally transverse to the axis of the neck. Of course, it is contemplated that other means may be employed to urge pinching means into operative position. The slug 28 in cross section can be seen in a number of Figures, for example, FIG. 6, 7 and 13. The top plan view of FIG. 5 also depicts the slug 28. The pinching of neck 12 effectively closes the neck. The other neck 13 remains open so that a nozzle 33 is positioned therein in the manner shown in FIG. 6 in order to introduce the gas, such as air, to blow mold the main body of the container and to complete the molding of the neck. The pressure of the air against the still hot thermoplastic material forces the material against the cavity walls. As the blow molding is completed the same nozzle is utilized to introduce a quantity of liquid, that is, the container is filled to a desired degree. The procedure of blow molding and filling is further exemplified in U.S. Pat. No. 3,325,860.

As the container is blow molded and filled or soon after the completion thereof, the transverse slug 28 may be shaped into a generally cone-like form 29. Turning to FIG. 8, for instance, tube 30, having an internally positioned opposing cone-like cavity 31 having perforations 32 is brought into position by suitable means to the upper surface of the slug 28. By applying a vacuum to the tube and combined with the positive pressure in the body of the container the slug is deformed into the cone-like configuration shown in FIG. 8.

Upon the completion of the formation of the cone 29 and the filling operation, the appropriate nozzle 33 and tube 30 are withdrawn. The upper sectional molds 18 are closed. As the upper sectional molds are closed a vacuum is drawn in chambers 34, as a result the remaining extension portions 35 and 36 above necks 12 and 13, respectively are drawn into the respective cavities 24 due to a plurality of perforations 37. The upper sectional molds thereby pinch closed the upper portions 35 and 36 and form a cap 14 about the cone 29 which is displaced therefrom.

The latter operation essentially completes the formation of the container of the present invention. The neck 12 terminates in a closed cone about which a cap 14 is positioned. The other neck merely possesses a cap having essentially the same configuration as the cap about the cone. Both caps have been molded whereby the thermoplastic material at the locale where they join the top of the neck is quite thin. This thinness is designed to make it possible to easily breakaway the cap. Of course, when the cap above neck 13 is broken off access to the interior of the container is thereby provided. On the other hand, breaking away the cap above neck 12 still does not provide access to the interior of the body 15 of the container 11 as one is still confronted with the cone. This is desirable as the underlying cone is maintained in a sterile clean condition as long as the cap has not been removed. As the temperature during the forming of the cone and the container is higher than bacteria and other organisms can tolerate, the thermoplastic is sterile. To obtain access to the contents of the container through the cone, the cone must be punctured. In use, it may be desirable to breakoff the cap surrounding the cone; then puncture the cone; and then follow this with attaching a flexible conduit, for instance. The cap above neck 13 may be broken away, if desired, to equalize pressure conditions.

Figure 10:
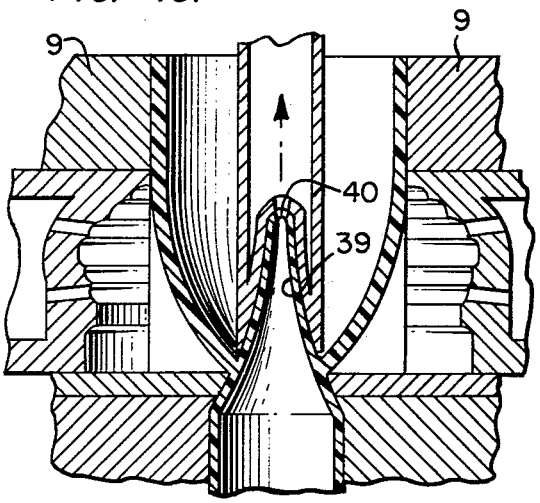
FIG. 10 is another embodiment of the arrangement of FIG. 8.
Figure 11:
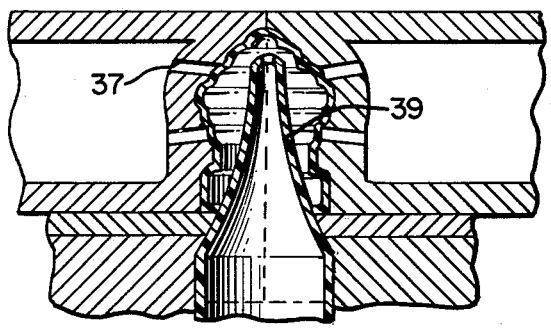
FIG. 11 is a similar view as in FIG. 10.

In another embodiment as shown in FIGS. 10 and 11, the cone 39 may be punctured with a preformed aperture 40 during the formation of the cone. This can be accomplished by having an axially disposed opening in the cavity of the tube through which a sufficiently large vacuum may be applied to burst the end of the cone to form an aperture. FIG. 11 shows the resultant after the cap has been formed by the upper sectional molds. It is also contemplated that the opening may be made by a means having a sharp point.

Figure 13:
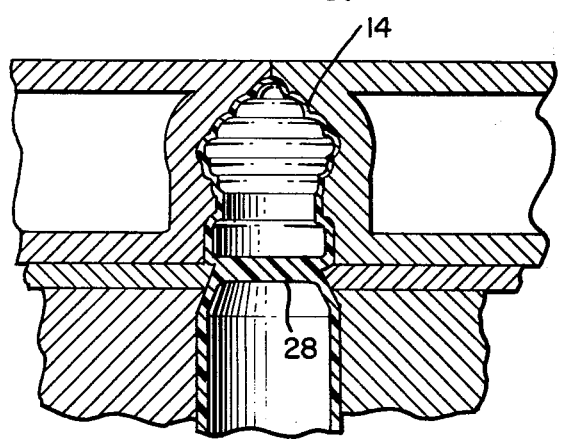
FIG. 13 is a similar view as in FIG. 7.

In another embodiment, as shown by FIG. 13, no cone is formed, but rather the slug 28 is left as originally formed and the cap thereabove is formed. This last embodiment is useful when the slug is to be employed as a breachable seal. A sharp cannula may be used to puncture the slug, after the cap 14 has been removed, in order to introduce material or to remove material.

Figure 15:
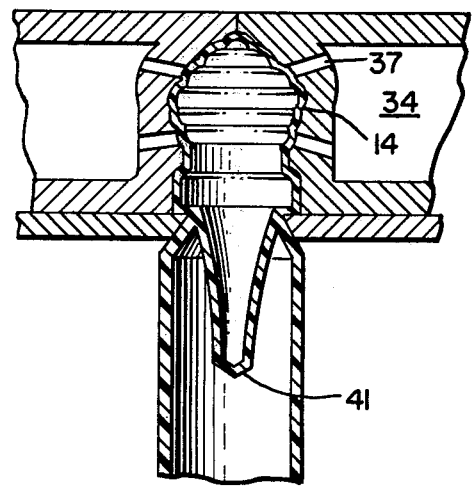
FIG. 15 is a similar view as in FIG. 14.

Another embodiment within the purview of the inventive concept is the creation of an inverted cone or cone-like membrane which extends downwardly into neck 12. This can be accomplished by employing a pointed rod which deforms slug 28 inwardly. Illustrative of this concept is FIG. 14 and the resultant as shown in FIG. 15. It will be noted that a generally pointed rod 40 is used to deform the slug 28 into an inverted cone or frusto-conical membrane 41. FIG. 15 shows the cap 14 in position.

As neck 13 is primarily employed for the introduction of material, liquid or gas, for isntance, it is possible to completely eliminate the neck 13 when there is no need therefor. With regard thereto attention is directed to FIG. 12. Neck 12 is positioned axially with respect to a cylindrical container. The other neck has been pinched off at 42 and the surface is sealed to leave only a vestige of the neck. It will be seen that the body of the container is corrugated so that it may be collapsed axially. When the cap is broken off and the underlying cone has been or is punctured the contents in the container may be retrieved by squeezing the container to collapse it and the contents will be dispensed through the cone having an aperture.

We claim:

1. An apparatus for molding and sealing a container comprising:

an extrusion head adapted to extrude a length of thermoplastic tubing;

at least one sectional mold assembly which is arranged and constructed to enclose said length of extruded tubing;

said mold assembly including a lower sectional mold adapted to shape the body and close the bottom of the container and to shape at least two neck-like members extending from the top of such container;

means to sever the extruded tubing at a plane displaced above said neck-like members;

said mold assembly being so constructed and arranged, and including means above said lower sectional mold adapted to pinch closed all but one of the top portions of the formed neck-like members to form a breachable sealing membrane the major plane of which is disposed generally transverse to a longitudinal axis of said neck-like member;

fluid pressure applying nozzle adapted to be introduced into the remaining open said neck-like member to supply fluid under pressure to expand said tubing in said lower sectional mold into contact with at least a part of said lower sectional mold to form a body of said container; and said mold assembly including an upper sectional mold arranged and constructed to shape that portion of the extruded tubing above said neck-like member into a pinched-off closed cap above said breachable sealing membrane.

2. The apparatus of claim 1, further including means to force upwardly said breachable sealing membrane in an axial manner within said neck-like member and above said body, so that said membrane is of non-planar form and is enclosed by said closed cap.

3. The apparatus of claim 2, wherein said means to draw upwardly said breachable sealing membrane include means to deform said membrane into a generally cone-like shape.

4. The apparatus of claim 2, wherein said means to draw upwardly said breachable sealing membrane include means to deform sid membrane into a generally frusto-conical-like shape.

5. The apparatus of claim 2, wherein the means to force said breachable sealing membrane upwardly include means for establishing a fluid pressure differential on opposite sides of said membrane.

6. The apparatus of claim 2, wherein the means to force said breachable sealing membrane upwardly include vacuum drawing means operable on and from above said membrane.

7. The apparatus of claim 2, further including means to effect puncturing of said membrane.

8. The apparatus of claim 1, further including means to deform axially into at least one of said neck-like members said breachable sealing membrane in a direction toward said container body.

9. The apparatus of claim 8, wherein said deforming means includes means to provide said membrane with an inverted general cone-like shape.

10. The apparatus of claim 8, wherein said deforming means includes means to provide said membrane with an inverted generally frusto-conical shape.

11. An apparatus for molding and sealing a container comprising:

an extrusion head adapted to extrude a length of thermoplastic tubing;

at least one sectional mold assembly which is arranged and constructed to enclose said length of extruded tubing;

said mold assembly including a lower sectional mold adapted to shape the body and close the bottom of the container and to shape at least two neck-like members extending from such container;

means to sever the extruded tubing at a plane displaced above said neck-like members;

said mold assembly including means above said lower sectional mold adapted to pinch closed all but one of the top portions of the formed neck-like members to form a breachable sealing membrane;

means to draw upwardly said breachable sealing membrane to form a cone within at least one of said neck-like members;

fluid pressure applying nozzle adapted to be introduced into the remaining open said neck-like member to supply fluid under pressure to expand said tubing in said lower sectional mold into contact with at least a part of said lower sectional mold to form a body of said container; and said mold assembly including an upper sectional mold arranged and constructed to shape that portion of the extruded tubing above said neck-like members into a cap.

12. The apparatus of claim 11, wherein the means to form said cone includes means to puncture said cone.

13. An apparatus for molding and sealing a container comprising:

an extrusion head adapted to extrude a length of thermoplastic tubing;

at least one sectional mold assembly which is arranged and constructed to enclose said length of extruded tubing;

said mold assembly including a lower sectional mold adapted to shape the body and close the bottom of the container and to shape at least two neck-like members extending from such container;

means to sever the extruded tubing at a plane displaced above said neck-like members;

said mold assembly including means above said lower sectional mold adapted to pinch closed all but one of the top portions of the formed neck-like members to form a breachable sealing membrane;

means to deform downwardly into the neck-like member said breachable sealing membrane; and wherein said means to deform the breachable sealing membrane includes puncturing means;

fluid pressure applying nozzle adapted to be introduced into the remaining open said neck-like member to supply fluid under pressure to expand said tubing in said lower sectional mold into contact with at least a part of said lower sectional mold to form a body of said container; and said mold assembly including an upper sectional mold arranged and constructed to shape that portion of the extruded tubing above said neck-like members into a cap.

\* \* \* \* \*